United States Patent
Taboulot et al.

(10) Patent No.: US 9,617,184 B2
(45) Date of Patent: Apr. 11, 2017

(54) GYPSUM-BASED BUILDING PRODUCTS AND METHOD FOR THE MANUFACTURE THEREOF

(71) Applicant: Saint-Gobain Placo SAS, Suresnes (FR)

(72) Inventors: Elodie Taboulot, Aubervilliers (FR); Clement Houga, Aubervilliers (FR)

(73) Assignee: Saint-Gobain Placo SAS (FR)

( * ) Notice: Subject to any disclaimer, the term of this patent is extended or adjusted under 35 U.S.C. 154(b) by 145 days.

(21) Appl. No.: 14/403,419

(22) PCT Filed: May 23, 2013

(86) PCT No.: PCT/EP2013/060677
§ 371 (c)(1),
(2) Date: Nov. 24, 2014

(87) PCT Pub. No.: WO2013/174951
PCT Pub. Date: Nov. 28, 2013

(65) Prior Publication Data
US 2015/0114264 A1    Apr. 30, 2015

(30) Foreign Application Priority Data
May 25, 2012   (EP) .................................... 12290175

(51) Int. Cl.
| | |
|---|---|
| *C04B 11/00* | (2006.01) |
| *C04B 26/28* | (2006.01) |
| *C04B 28/02* | (2006.01) |
| *C04B 14/36* | (2006.01) |
| *C04B 26/02* | (2006.01) |

(Continued)

(52) U.S. Cl.
CPC ............ *C04B 11/00* (2013.01); *C04B 14/365* (2013.01); *C04B 24/14* (2013.01); *C04B 24/38* (2013.01); *C04B 26/026* (2013.01); *C04B 26/285* (2013.01); *C04B 28/02* (2013.01); *C04B 2111/0062* (2013.01)

(58) Field of Classification Search
CPC ....................................................... C04B 11/00
See application file for complete search history.

(56) References Cited

U.S. PATENT DOCUMENTS

| | | | | |
|---|---|---|---|---|
| 3,975,320 A | * | 8/1976 | Lane ..................... | C09K 3/1028 |
| | | | | 106/784 |
| 2006/0196391 A1 | * | 9/2006 | Hassan ................... | C04B 24/08 |
| | | | | 106/271 |

(Continued)

FOREIGN PATENT DOCUMENTS

| | | |
|---|---|---|
| CA | 1230695 A1 | 12/1987 |
| WO | 2010130876 A1 | 11/2010 |

*Primary Examiner* — Paul Marcantoni
(74) *Attorney, Agent, or Firm* — GrayRobinson, P.A.; Michael J. Colitz, III (57) ABSTRACT

A building product comprises calcium sulphate dihydrate particles bound by an organic binder. The calcium sulphate dihydrate particles each have a longest dimension and a lateral dimension, wherein the lateral dimension corresponds to the maximum breadth of the particle about the axis defined by the longest dimension. The calcium sulphate dihydrate particles have a low aspect ratio such that for at least 75% of the calcium sulphate dihydrate particles, the value of the lateral dimension is at least 20% of the value of the longest dimension.

8 Claims, 3 Drawing Sheets

(51) Int. Cl.
*C04B 24/14* (2006.01)
*C04B 24/38* (2006.01)
*C04B 111/00* (2006.01)

(56) References Cited

U.S. PATENT DOCUMENTS

2009/0110946 A1* 4/2009 Martin .................. C04B 24/34
428/537.7
2009/0273113 A1 11/2009 Baig

* cited by examiner

GYPSUM-BASED BUILDING PRODUCTS AND METHOD FOR THE MANUFACTURE THEREOF

CLAIM OF PRIORITY

This application is a continuation of and claims priority under 35 U.S.C. §371 to International Application No. PCT/EP2013/060677 filed on May 23, 2013, which in turn claims priority to EP 12290175.4 filed on May 25, 2012. The contents of both these applications are incorporated herein by reference for all purposes.

The present invention concerns gypsum-based building products, formulations which can be used to form such building products, and a method of making such building products from gypsum.

Gypsum is a naturally occurring form of calcium sulphate, in the form of a stable dihydrate ($CaSO_4\ 2H_2O$). The term "gypsum", as used herein, means calcium sulphate in that stable dihydrate state; and includes the naturally occurring mineral, the synthetically derived equivalents (e.g. gypsum obtained from the fuel industry and/or recycling processes), and the dihydrate material formed by the hydration of stucco (calcium sulphate hemihydrate) or anhydrite.

The properties of gypsum make it highly suitable for use in industrial and building plasters and other building products such as gypsum wallboard. It is a plentiful and generally inexpensive raw material which, through successive steps of dehydration and rehydration, can be cast, moulded or otherwise formed to useful shapes. For example, gypsum wallboard; also known as plasterboard or drywall, is formed as a set gypsum core sandwiched between paper cover sheets.

Gypsum is conventionally prepared for use as plaster by grinding and calcining at temperatures such as from about 120 to 170° C., generally at atmospheric pressure. This results in partially dehydrated gypsum, typically in the form of the beta crystalline form of the hemihydrate, which may be used as a building or construction material by mixing it with water to form an aqueous stucco slurry, paste or dispersion, and then allowing the slurry to set by recrystallisation from the aqueous medium.

A characterising feature of calcium sulphate particles that are formed through this known process of calcination and re-hydration is that they are needle-shaped, that is, acicular. Effectively, therefore such particles have a high aspect ratio, the aspect ratio being the ratio of the longest dimension of the particle to its transverse dimension.

Gypsum wallboard generally consists of a hardened gypsum-containing core surfaced with paper or other fibrous material suitable for receiving a coating such as paint. It is common to manufacture gypsum wallboard by sandwiching an aqueous core slurry predominantly comprising calcined gypsum between two cover sheets and allowing the aqueous gypsum core slurry to set or harden by rehydration of the calcined gypsum, usually followed by heat treatment in a dryer to remove excess water. After the gypsum slurry has set (i.e., reacted with water present in the aqueous slurry) and dried, the formed sheet is cut into required sizes.

However, calcining of gypsum to the partially dehydrated form, and the drying step, are both energy intensive process and it is therefore a goal to provide a method in which gypsum can be used to make building products with less embodied energy.

At its most general, the present invention may provide a building product (e.g. a board for providing a partition) that is formed by mixing a particulate matrix directly with a binder. The binder effectively glues the matrix together, but it is not expected that any chemical reaction will occur between the binder and the matrix. The matrix may comprise e.g. calcium sulphate dihydrate, sand, calcium carbonate, or other inert hard particles. Alternatively, the matrix may comprise rubber. Typically, the binder is organic. Typically, the binder is a viscoelastic glue.

In general, the matrix provides at least 50 wt %, preferably at least 60 wt %, most preferably at least 65 wt % of the building product.

Typically, the matrix is calcium sulphate dihydrate. In this case, the method allows the energy-intensive steps of calcining and drying to be avoided.

Since the calcium sulphate particles present in the building product have not undergone the process of calcination and re-hydration, they generally do not grow in a needle-shaped form.

Thus, it is normally possible to distinguish building products formed through direct mixing of calcium sulphate dihydrate with a binder from products formed through the known process of calcination and re-hydration, by considering the shape of the calcium sulphate dihydrate particles, in particular their aspect ratio. Typically, calcium sulphate dihydrate particles in a product formed by direct mixing of the particles with a binder have a more block-like shape than the needle-shaped particles formed in the known process of calcination and re-hydration.

Therefore, in a first aspect, the present invention may provide a building product comprising calcium sulphate dihydrate particles bound by an organic binder,
  the calcium sulphate dihydrate particles each having a longest dimension and a lateral dimension, the lateral dimension corresponding to the maximum breadth of the particle about the axis defined by the longest dimension,
  the calcium sulphate dihydrate particles having a low aspect ratio such that for at least 75% of the calcium sulphate dihydrate particles, the value of the lateral dimension is at least 20% of the value of the longest dimension.

The calcium sulphate particles provided in a product according to this aspect of the invention may be e.g. plate-like or block-like, rather than needle-like. Effectively, therefore, the calcium sulphate particles have a low aspect ratio, for example, an aspect ratio lower than 10, in certain cases lower than 5, in other cases lower than 3.

The lateral dimension extends crossways to the longest dimension, for example, perpendicularly to the longest dimension.

Generally, at least 85% of the calcium sulphate dihydrate particles have a lateral dimension that is at least 20% of the longest dimension.

Typically, at least 75%, in some cases at least 85%, of the calcium sulphate dihydrate particles have lateral dimension that is at least 30% of the longest dimension. In certain cases, at least 75% of the calcium sulphate dihydrate particles have lateral dimension that is at least 40%, in some cases at least 50% or at least 60%, of the longest dimension.

Typically, the $D_{50}$ particle size of the calcium sulphate dihydrate particles (that is, the equivalent particle diameter value that is greater than the equivalent particle diameter of exactly 50 wt % of the particles) is greater than 3 µm, in certain cases greater than 20 µm or greater than 50 µm. In general, the $D_{50}$ particle size is less than 2 mm, in certain cases less than 0.5 mm, in some cases less than 250 µm. The $D_{50}$ size of the calcium sulphate dihydrate particles may be measured e.g. by laser granulometry.

Typically, the building product is a self-supporting body. For example, it may be a monolithic element such as a gypsum board. The term "self-supporting body" excludes coatings (such as those produced through the application of jointing compounds) since coatings are not self-supporting, but are instead supported on a substrate. In general, the building product is a rigid body.

In certain embodiments, the building product may have an approximately planar shape (that is, its size along one dimension is considerably lower than along the remaining two dimensions). In alternative embodiments, the building product may have a blocky shape. Typically, the volume of the building product is greater than 0.005 m$^3$, preferably greater than 0.007 m$^3$, more preferably greater than 0.01 m$^3$.

The gypsum particles used in this building product are preferably natural. Alternatively, they may be derived from an industrial source, provided that they are in the form of the dihydrate. In certain cases, the gypsum may be a mixture of natural and synthetic calcium sulphate dihydrate. For example, the calcium sulphate dihydrate particles may comprise gypsum formed through flue gas desulphurization.

Typically, the binder may include a vegetable-derived organic binder, such as an alkyd resin, for example, one based on triglycerides derived from polyunsaturated fatty acids from plant or vegetable oils (such as, linseed oil). Other suitable such organic binders include soy protein, pine resins (such as rosin, modified rosins and their derivatives, poly-terpene, modified terpenes, terpene-phenol resins or rosin ester resins), starch and starch derivatives, and modified natural rubber latex.

Starch binders may include pre-gelatinised starches and non pre-gelatinised starches. A preferred example of a pre-gelatinised starch is Staramic 747™. A preferred example of a non pre-gelatinised starch is native corn starch.

Preferably, the binder comprises starch or soy protein. The organic binder may be a water-based glue.

In certain cases, the binder may comprise an adhesive composition of polyaminopolyamide-epichlorohydrin (PAE) resin and protein, such as that described in US 2008/0050602.

In certain cases, the binder may comprise a mixture of organic binder compounds. The binder may comprise natural and/or synthetic compounds.

In certain cases, the binders may be provided in a modified, cross-linked form. Cross-linking may be induced through addition, elimination, substitution, condensation, mineral or metal complexation, radiation curing, and/or a coupling reaction, as is known in the art.

Although the binder is typically a vegetable-derived organic binder, other forms of binder are also possible. For example, the binder may be a synthetic organic binder, e.g. it may be derived from petrochemicals. For example, the binder may be an adhesive composition such as described in CA1230695, which is hereby incorporated by reference.

In this case, the binder may comprise, for example, aliphatic or aromatic hydrocarbon resins, phenol resins, xylene resins, or coumarone-indene resin. Such resins may be provided in the form of an adhesive composition, further comprising one or more of the following components: an aqueous dispersion of a natural or synthetic polymer, an inorganic filler, a fibrous filler, and a surfactant.

Typically, the binder does not comprise cellulose or cellulosic thickeners, such as may be found in jointing compounds. In other cases, cellulose or cellulosic thickener is present in an amount of less than 0.2 wt % of the building product, preferably less than 0.1 wt %.

Typically, the building product comprises at least 0.5 wt % organic binder, preferably at least 1 wt %, in certain cases at least 5 wt %. In general, the building product comprises less than 30 wt % organic binder, preferably less than 20 wt %, more preferably less than 15 wt %.

In general, the building product comprises at least 50 wt % calcium sulphate dihydrate particles, preferably at least 60 wt %, more preferably at least 65 wt %. Typically, the building product comprises less than 99 wt % calcium sulphate dihydrate particles, preferably less than 95 wt %, more preferably less than 90 wt %.

The building product according to the first aspect of the invention may further comprise an inorganic binder e.g. cement, lime stucco, or another pozzolanic binder. The inorganic binder is typically present in an amount up to 20 wt % of the building product, preferably up to 15 wt %.

The presence of inorganic binder is not essential, as the strength of the building product derives mainly from the organic binder. In fact, in certain embodiments of the invention, there is no inorganic binder present, or less than 1 wt % inorganic binder.

In certain cases, the binder may comprise a mixture of two or more materials, e.g. an organic material mixed with an inorganic material.

Because gypsum has a density of 2.32 kg/m$^3$, it is frequently desirable to reduce the density of gypsum-based product by the addition of lightweight fillers, of which those listed in the following Table are given by way of example:

TABLE

| Filler | Density (kg/m$^3$) |
|---|---|
| Expanded polystyrene (EPS) | 0.02 |
| Cenisphere | 0.4-0.8 |
| Perlite | 0.03-0.15 |
| Vermiculite | 0.45-1.05 |
| Other expanded clay | 0.33-0.48 |
| Cork | 0.11-0.21 |
| Rubber | 0.5 |
| Wood (chip) | 0.7 |
| Bagasse | 0.12 |
| Bran | 0.25 |
| Saw dust | 0.21 |
| Natural fibres | 1.5 |
| Aerocellulose | 0.06-0.3 |
| Ecocradle* | 0.11-0.33 |
| Greensulate* | 0.17-0.3 |
| Glass bubble | 0.1-0.3 |

*Ecocradle and Greensulate are trade marks

The lightweight filler is typically provided in particulate form, the particle size generally lying in the range 30 μm to 4 mm.

Other filler materials, such as silica sand, dolomite or calcium carbonate may also be added.

As a result of its composition, the building product typically has a density that is broadly comparable to that of conventional plasterboard. That is, lowest density of the building products according to the first aspect of the invention may be in the region of 250 kg/m$^3$, possibly in the region of 300 kg/m$^3$ or 400 kg/m$^3$. In these cases, the process of formation of this building product may typically include the addition of stabilised foam to the calcium sulphate dihydrate and binder mixture.

Typically, the highest density of building products according to the first aspect of the invention is in the region of 1600 kg/m$^3$, possibly in the region of 1400 kg/m$^3$ or 1300 kg/m$^3$.

Densities lying in the range between the highest and lowest values cited are also possible.

The building product may be in the form of a board. In this case, the board may further include reinforcing fibres. Such reinforcing fibres may include glass fibres (typically cut fibres) or other fibres conventionally employed in gypsum board. Such a board according to the invention may be with or without surface reinforcement or liner sheets; when surface reinforcement is used, it may, for example, be of fibre scrim, fibre mesh, paper, glass mat, polyester mat, natural fibre mat (e.g. hemp, wood, bamboo, or flax), cotton/polyester mat, polyester/glass mat. In certain embodiments, a liner sheet may have a honeycomb structure. Preferably, the liner sheet comprises 3-ply paper.

Other non-deleterious materials, adjuvants and ingredients may, when appropriate, be present in the building product. Such non-deleterious materials may include optional further ingredients, such as moisture repellents (such as silicone oils or waxes, bactericides, fungicides, colouring agents and fire retardants), fluidisers, surfactants (e.g. anionic surfactants, cationic surfactants, or a mixture of both), stabilised foam, adsorbents for volatile organic compounds (that is, VOC scavengers), and siccative agent. The presence of siccative agent may be particularly preferred when the binder comprises alkyd resin.

In a second aspect, the present invention provides a method of manufacturing a gypsum-based product, comprising the steps of:
   providing a quantity of particles of calcium sulphate dihydrate;
   providing an organic binder for binding the particles of calcium sulphate dihydrate together; and
   mixing the particles of calcium sulphate dihydrate with the binder.

In general, the method comprises the further step of allowing the mixture of calcium sulphate dihydrate and binder to cure to provide a building product that is a self-supporting body.

The binder may be provided in powder form, or as an aqueous solution or an aqueous emulsion/dispersion. In general, the method includes the step of curing the binder, to ensure bonding between gypsum particles.

The method of the second aspect of the invention may comprise the further step of adding an inorganic binder, e.g. cement, lime stucco, or another pozzolanic binder. It is thought that use of an inorganic binder may enhance mechanical properties of the gypsum-based product, in particular, the early strength and setting of the product.

The gypsum used according to the invention is preferably natural and may be crushed or ground before mixing with the binder.

Because gypsum has a density of 2.32 kg/m$^3$, it is frequently desirable to reduce the density of gypsum-based product by the addition of lightweight fillers, such as those listed in relation to the first aspect of the invention.

In addition to this, or as an alternative, the density of the gypsum-based product may be lowered through the addition of foam.

The components used in the formation of a building product according to the method of the second aspect of the invention may each individually comprise optional features of the components present in the building product of the first aspect of the invention.

The building product formed through the method of the second aspect of the invention may have any of the optional features of the building product of the first aspect of the invention.

In a third aspect, the present invention may provide a gypsum formulation comprising
i) finely divided gypsum (that is, calcium sulphate dihydrate) as a predominant proportion by weight of the formulation; and
ii) as binder for the gypsum, a vegetable-derived organic adhesive material, in a minor proportion by weight of the formulation.

The components of the gypsum formulation according to the third aspect of the invention may each individually comprise optional features of the components present in the building product of the first aspect of the invention.

Certain advantageous features of the invention and the way it can be put into operation are now illustrated in the following worked illustrative Examples, with reference to the following Figures.

Example 1

Test specimens in the shape of prisms were prepared from gypsum, a starch binder, and optionally, a filler material. The starch was either a non pre-gelatinised starch (in this case, a native corn starch), or one of two pre-gelatinised starches (pre-gelatinised starch 1=staramic 747 from Tate & Lyle; pre-gelatinised starch 2=ICB 1300 from Tate & Lyle). The density and flexural strength were measured and are set out in Table 1.

TABLE 1

| composition | density (kg/m$^3$) | flexural strength (N/mm$^2$) |
|---|---|---|
| 100 parts of gypsum- 30 μm<br>5 parts of pregelatinised starch 1<br>1.5 part of EPS | 646 | 1.1 |
| 100 parts of gypsum- 30 μm<br>0.13 parts of pregelatinised starch 1 | 1395 | 1.32 |
| 100 parts of gypsum- 30 μm<br>2 parts of pregelatinised starch 1 | 1488 | 5.6 |
| 100 parts of gypsum- 30 μm<br>5 parts of pregelatinised starch 1 | 1430 | 9.8 |
| 100 parts of gypsum- 100 μm<br>5 parts of pregelatinised starch 1 | 1330 | 5.6 |
| 100 parts of gypsum- 1 mm<br>5 parts of pregelatinised starch 1 | 1243 | 1.3 |
| 100 parts of gypsum- 30 μm<br>2.5 parts of non pregelatinised starch | 1397 | 5.4 |
| 100 parts of gypsum- 30 μm<br>5 parts of non pregelatinised starch | 1372 | 9.5 |
| 100 parts of gypsum- 30 μm<br>5 parts of non pregelatinised starch<br>35 parts of Expended Clay (2-4 mm) | 798 | 3.1 |
| 100 parts of gypsum- 30 μm<br>5 parts of non pregelatinised starch<br>parts of rubber | 1082 | 5.1 |

TABLE 1-continued

| composition | density (kg/m³) | flexural strength (N/mm²) |
|---|---|---|
| 100 parts of gypsum- 30 μm 5 parts of non pregelatinised starch 12.5 parts of Expended clay | 1085 | 4.5 |
| 100 parts of gypsum- 30 μm 5 parts of non pregelatinised starch 25 parts of Expended clay | 1103 | 3.5 |
| 100 parts of gypsum- 30 μm 5 parts of pregelatinised starch 2 Lightened with foam | 769 | 1.2 |
| 100 parts of gypsum- 30 μm 5 parts of pregelatinised starch 2 Lightened with foam | 734 | 1.2 |
| 100 parts of gypsum- 30 μm 5 parts of pregelatinised starch 2 Lightened with foam | 652 | 0.8 |
| 100 parts of gypsum- 30 μm 5 parts of pregelatinised starch 2 Lightened with foam | 592 | 0.5 |

Example 2

Test specimens in the shape of prisms were prepared from gypsum, an alkyd resin binder, a filler material, and optionally, a siccative agent. The alkyd resin is a commercial product from Cray Valley. A siccative agent from OMG Borcher was used for several examples. The density and flexural strength were measured and are set out in Table 2.

TABLE 2

| composition | density (kg/m³) | flexural strength (N/mm²) |
|---|---|---|
| 100 parts of gypsum- 30 μm 5 parts of Synaqua 4804 0.3 parts of siccative 0.5 part of EPS | 1013 | 5.15 |
| 100 parts of gypsum- 30 μm 5 parts of Synaqua 4804 0.3 parts of siccative 1. parts of EPS | 825 | 3.81 |
| 100 parts of gypsum- 30 μm 5 parts of Synaqua 4804 0.3 parts of siccative 1.5 parts of EPS | 645 | 2.3 |
| 100 parts of gypsum- 30 μm 5 parts of Synaqua 4804 0.3 parts of siccative 2 parts of EPS | 578 | 1.04 |
| 100 parts of gypsum- 30 μm 5 parts of Synaqua 4804 0.5 parts of EPS | 988 | 4.99 |
| 100 parts of gypsum- 30 μm 5 parts of Synaqua 4804 1 parts of EPS | 825 | 3.81 |
| 100 parts of gypsum- 30 μm 5 parts of Synaqua 4804 1.5 parts of EPS | 629 | 2.21 |
| 100 parts of gypsum- 30 μm 5 parts of Synaqua 4804 2 parts of EPS | 563 | 2.2 |
| 100 parts of gypsum- 30 μm 3 parts of Synaqua 4804 0.5 part of EPS | 1087 | 3.16 |
| 100 parts of gypsum- 30 μm 3 parts of Synaqua 4804 1 part of EPS | 876 | 2.24 |
| 100 parts of gypsum- 30 μm 3 parts of Synaqua 4804 1.5 parts of EPS | 769 | 2.34 |
| 100 parts of gypsum- 30 μm 2 parts of EPS | 680 | 1.76 |

TABLE 2-continued

| composition | density (kg/m3) | flexural strength (N/mm²) |
|---|---|---|
| 100 parts of gypsum- 30 μm 3 parts of Synaqua 4804 2.5 parts of EPS | 562 | 1.50 |
| 100 parts of gypsum- 30 μm 5 parts of Synaqua 4804 Lightened with foam | 758 | 1.13 |
| 100 parts of gypsum- 30 μm 5 parts of Synaqua 4804 Lightened with foam | 640 | 0.87 |
| 100 parts of gypsum- 30 μm 5 parts of Synaqua 4804 Lightened with foam | 580 | 0.66 |

Example 3

Test specimens in the shape of prisms were prepared from gypsum, a protein-based binder (Soyad, developed by the Hercules group), and a filler material. The density and flexural strength were measured and are set out in Table 3.

TABLE 3

| composition | density (kg/m3) | flexural strength (N/mm²) |
|---|---|---|
| 100 parts of gypsum- 30 μm 3 parts of Soyad 0.5 part of EPS | 1066 | 1.19 |
| 100 parts of gypsum- 30 μm 3 parts of Soyad 1. parts of EPS | 869 | 0.8 |
| 100 parts of gypsum- 30 μm 3 parts of Soyad 1.5 parts of EPS | 733 | 0.61 |
| 100 parts of gypsum- 30 μm 3 parts of Soyad 2 parts of EPS | 642 | 0.51 |
| 100 parts of gypsum- 30 μm 10 parts of Soyad 0.5 parts of EPS | 962 | 3.48 |
| 100 parts of gypsum- 30 μm 10 parts of Soyad 1 parts of EPS | 748 | 2.31 |
| 100 parts of gypsum- 30 μm 10 parts of Soyad 1.5 parts of EPS | 645 | 1.74 |
| 100 parts of gypsum- 30 μm 10 parts of Soyad 2 parts of EPS | 572 | 1.5 |
| 100 parts of gypsum- 30 μm 13 parts of Soyad 0.5 part of EPS | 875 | 4.1 |
| 100 parts of gypsum- 30 μm 13 parts of Soyad 1 part of EPS | 742 | 3.58 |
| 100 parts of gypsum- 30 μm 13 parts of Soyad 1.5 parts of EPS | 643 | 2.66 |
| 100 parts of gypsum- 30 μm 13 parts of Soyad 2 parts of EPS | 643 | 2.36 |
| 100 parts of gypsum- 30 μm 13 parts of soyad Lightened with foam | 759 | 2.25 |
| 100 parts of gypsum- 30 μm 13 parts of soyad Lightened with foam | 838 | 4.17 |
| 100 parts of gypsum- 30 μm 13 parts of soyad Lightened with foam | 796 | 3.19 |
| 100 parts of gypsum- 30 μm 13 parts of soyad Lightened with foam | 636 | 2.05 |

TABLE 3-continued

| composition | density (kg/m3) | flexural strength (N/mm²) |
|---|---|---|
| 100 parts of gypsum- 30 μm 13 parts of soyad Lightened with foam | 694 | 2.08 |
| 100 parts of gypsum- 30 μm 13 parts of soyad Lightened with foam | 744 | 2.94 |

Example 4

Test specimens in the shape of prisms were prepared from gypsum, a pine-derived binder (terpene phenol emulsion TR602), and a filler material. The density and flexural strength were measured and are set out in Table 4.

TABLE 4

| composition | density (kg/m3) | flexural strength (N/mm²) |
|---|---|---|
| 100 parts of gypsum- 30 μm 3 parts of TR602 0.5 part of EPS | 1075 | 1.25 |
| 100 parts of gypsum- 30 μm 3 parts of TR602 1. parts of EPS | 842 | 1.09 |
| 100 parts of gypsum- 30 μm 3 parts of TR602 1.5 parts of EPS | 726 | 1.28 |
| 100 parts of gypsum- 30 μm 3 parts of TR602 2 parts of EPS | 631 | 078 |
| 100 parts of gypsum- 30 μm 5 parts of TR602 0.5 parts of EPS | 1093 | 2.05 |
| 100 parts of gypsum- 30 μm 5 parts of TR602 1 parts of EPS | 903 | 1.92 |
| 100 parts of gypsum- 30 μm 5 parts of TR602 1.5 parts of EPS | 747 | 1.87 |
| 100 parts of gypsum- 30 μm 5 parts of TR602 2 parts of EPS | 656 | 1.51 |

Measurement of Flexural Strength

After production, the prisms were dried for 24 hours at 40° C. and subsequently conditioned at 25° C. and 50% humidity for a further 24 hours. The flexural strength of the prisms was measured under three-point bending using a Zwick universal testing machine.

Production of Prisms

The following protocol was used to produce prisms containing a starch binder. An analogous method was used for prisms containing other binders.

1. Blend the powders: gypsum and additives (light weight fillers for example)
2. Mix water with powder starch
3. Pour the gypsum powder blend into the water/starch mixture
4. Mix the powder blend and the water in a mixer (such as Kenwood mixer) until having a homogeneous slurry
5. If the sample comprises foam as a light weight agent, the foam, generated separately according to processes known in the art, is preferably added at this stage
6. Pour the slurry into the moulds
7. Skim the excess of gypsum slurry
8. Put the mould on a tray. The mould might be covered by a metal tray.
9. Cure/dry the samples in the mould for a suitable time and at a suitable temperature, e.g. 1 h30 at 140° C., 24 h at 40° C., or a time between 1 h30 and a temperature between 40° C. and 140° C.

The mechanical performance of the samples was tested at room temperature. The samples were held room temperature (15-25° C.) for at least a day before testing.

This method may be used for making boards having a thickness of ~13 mm. In this case the curing step is: 1 h10 at 120° C. Moreover, it is possible to add a paper liner on both sides before and after pouring the gypsum paste as is known in the art.

Scanning Electron Micrographs

Figure 3:
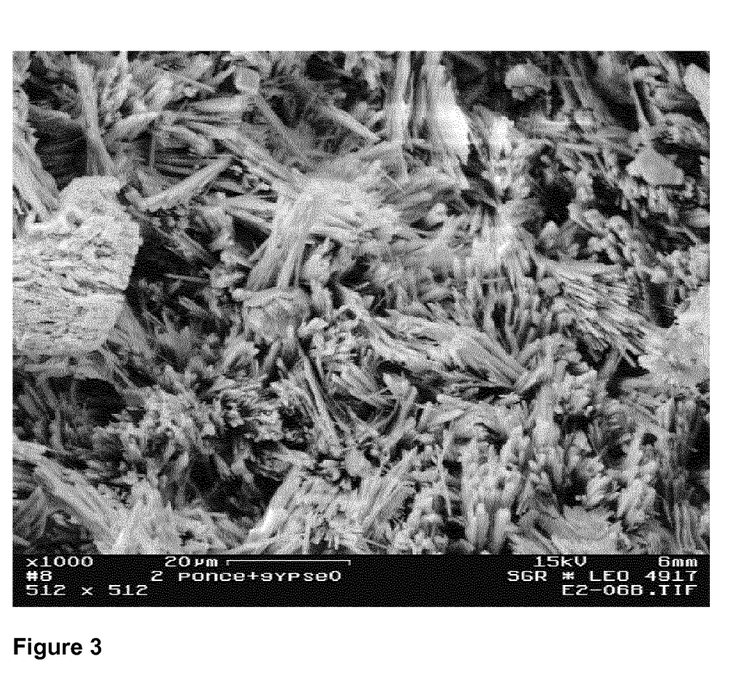
FIG. 3 is a scanning electron micrograph of a comparative example of a gypsum-based building product.
Figure 4:
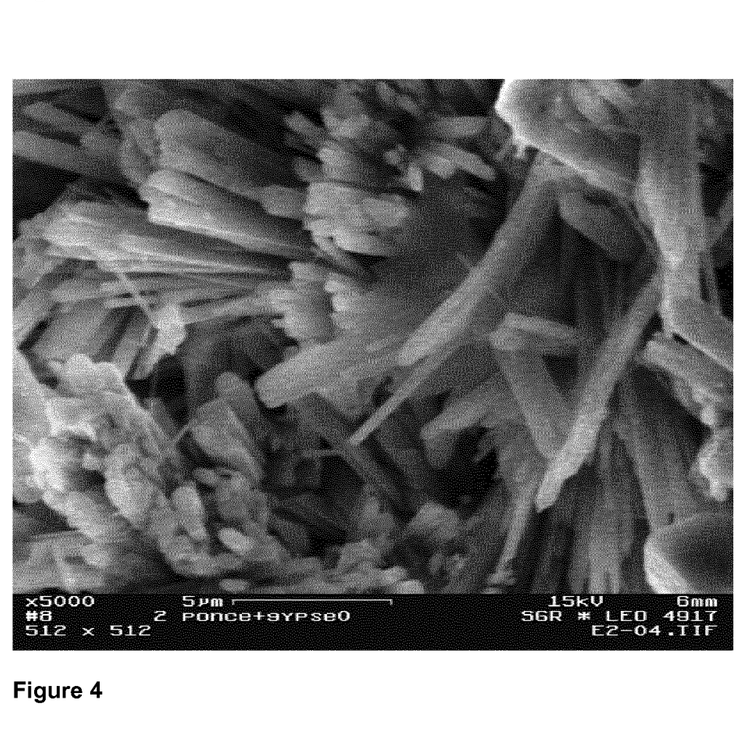
FIG. 4 shows the building product of FIG. 3 at a higher magnification.
Figure 5:
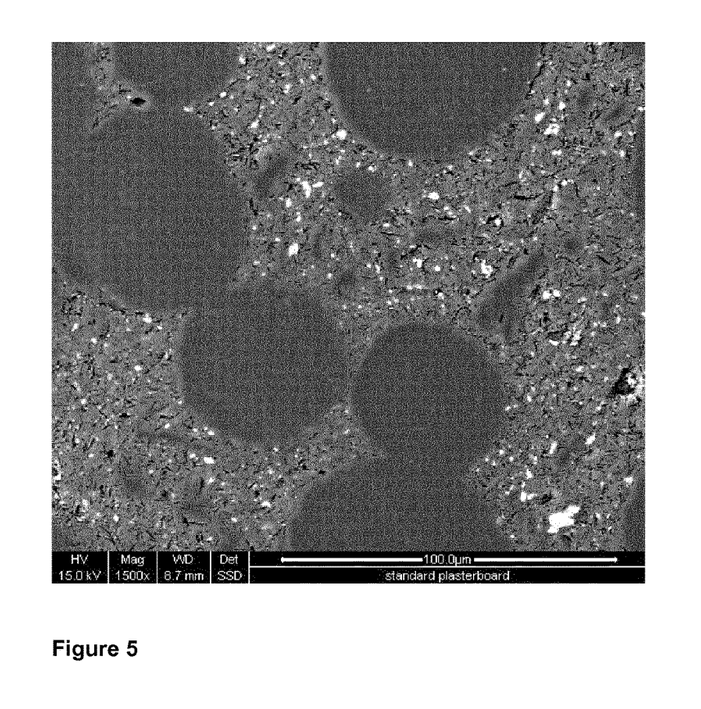
FIG. 5 shows the building product of FIG. 3 at a lower magnification.

FIGS. 3, 4, and 5 show scanning electron micrographs of gypsum plasterboards produced according to a known calcination and re-hydration process. It can be seen that this process results in the formation of needle-like gypsum crystals, having a high aspect ratio. The length of the needles is approximately 20 μm.

Figure 1:
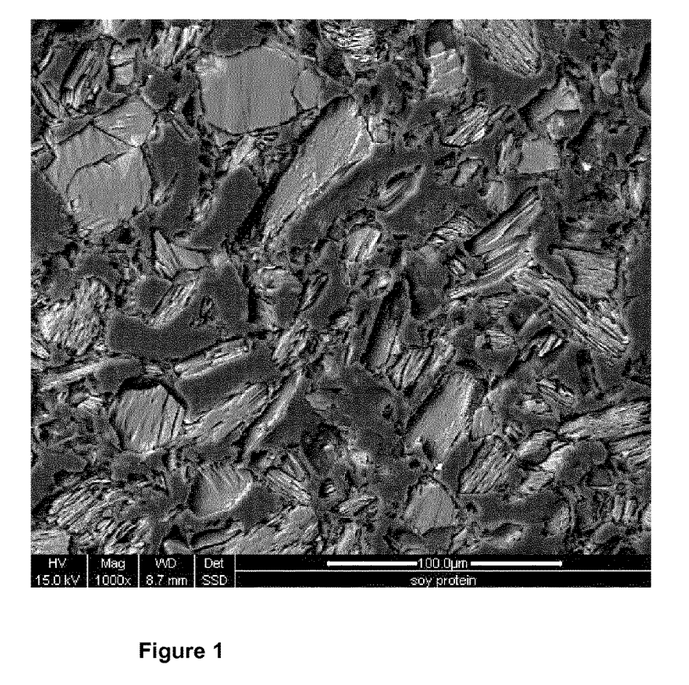
FIG. 1 is a scanning electron micrograph of a building product according to a first embodiment of the first aspect of the invention.
Figure 2:
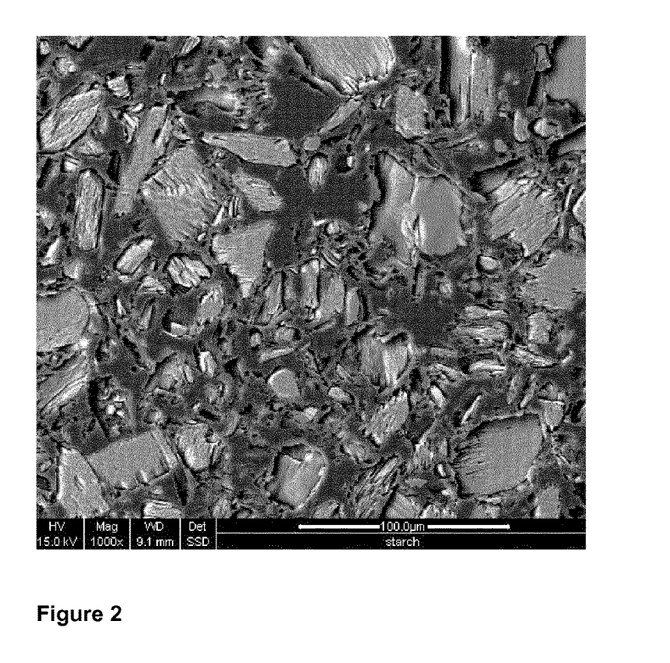
FIG. 2 is a scanning electron micrograph of a building product according to a second embodiment of the first aspect of the invention.

By contrast, FIGS. 1 and 2 show scanning electron micrographs of gypsum composite according different embodiments of the present invention. FIG. 1 shows a composite having a soy protein binder, while FIG. 2 shows a plasterboard having a starch binder. The gypsum crystals correspond to the pale areas of the micrograph, while the dark areas correspond to the binder and/or the epoxy resin used to mount the samples.

It can be seen that in gypsum plasterboards according to the present invention, the gypsum particles are more block-like than needle-like. Furthermore, the size of the gypsum particles in building products shown in FIGS. 1 and 2 is much greater than that of the gypsum needles present in the comparative example shown in FIGS. 3 to 5.

Figure 6:
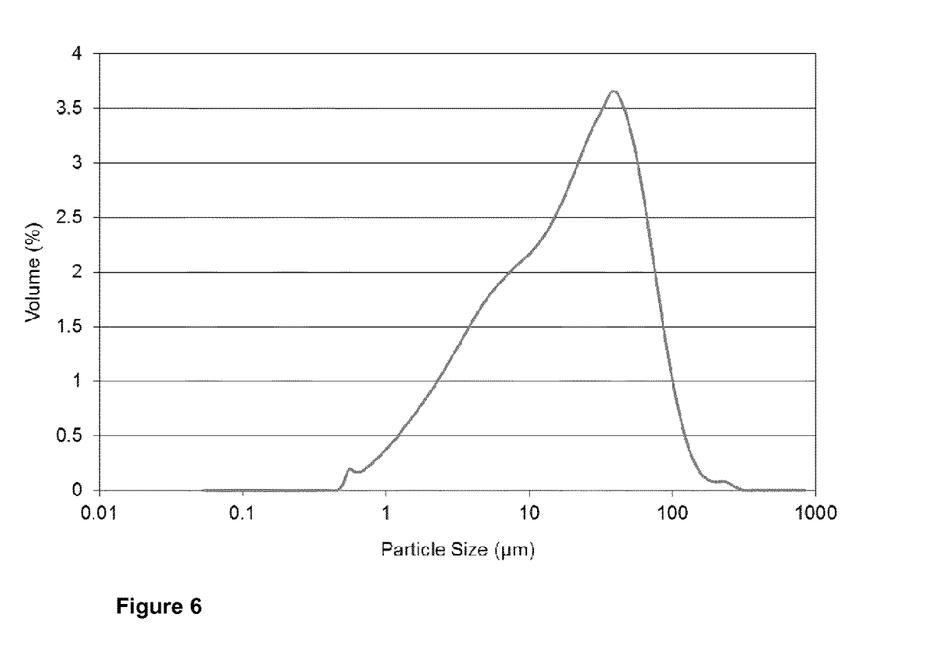
FIG. 6 shows a typical particle size distribution for gypsum particles in a composite specimen according to an embodiment of the present invention.

FIG. 6 shows a typical particle size distribution for gypsum particles in a composite specimen according to an embodiment of the present invention. From this it can be seen that in general gypsum particles in the composite specimen have a particle size between 1 and 100 μm. The majority of particles (measured by volume) have a particle size between 20 and 60 μm.

The invention claimed is:

1. A building product comprising calcium sulphate dihydrate particles bound by an organic binder:
   the building product being a self-supporting body;
   the calcium sulphate dihydrate particles each have a longest dimension and a lateral dimension, the lateral dimension corresponding to the maximum breadth of the particle about the axis defined by the longest dimension, and;
   the calcium sulphate dihydrate particles have a low aspect ratio such that for at least 75% of the calcium sulphate dihydrate particles, the value of the lateral dimension is at least 20% of the value of the longest dimension;
   characterised in that the calcium sulphate dihydrate particles are present in an amount of 50-90 wt % of the product.

2. A building product according to claim 1, wherein the calcium sulphate dihydrate particles each have a longest dimension and a lateral dimension, the lateral dimension corresponding to the maximum breadth of the particle about the axis defined by the longest dimension, and;
   the calcium sulphate dihydrate particles have a low aspect ratio such that for at least 75% of the calcium sulphate dihydrate particles, the value of the lateral dimension is at least 40% of the value of the longest dimension.

3. A building product according to claim 1, wherein the binder is a vegetable-derived organic binder that is optionally modified through cross-linking.

4. A building product according to claim 3, wherein the binder comprises one or more of the following:
   soy and/or a derivative of soy;
   starch and/or a starch derivative.

5. A building product according to claim 1, wherein the binder is present in an amount of 0.5-30 wt % of the product.

6. A building product according to claim 1, having a density in the range 250-1600 kg/m$^3$.

7. A building product according to claim 1, further comprising an inorganic binder, the inorganic binder optionally comprising a cementitious material.

8. A building product according to claim 7, wherein the inorganic binder is present in an amount of up to 20 wt %.

* * * * *